United States Patent [19]

Eriksson

[11] 4,089,057
[45] May 9, 1978

[54] METHOD AND DEVICE FOR MEASURING JUMP-LENGTHS ON A SKI-JUMP

[76] Inventor: Karl Erik Eriksson, Sturegatan 37A, 2tr., 791 00 Falun, Sweden

[21] Appl. No.: 759,918

[22] Filed: Jan. 17, 1977

[51] Int. Cl.² ........................... G01B 7/00; G06F 7/38
[52] U.S. Cl. .................................................. 364/562
[58] Field of Search ................... 235/151.32, 92 GA; 340/323 R

[56] References Cited

U.S. PATENT DOCUMENTS 3,508,440  4/1970  Murphy ...................... 235/151.32 X

*Primary Examiner*—Edward J. Wise
*Attorney, Agent, or Firm*—Silverman, Cass & Singer

[57] ABSTRACT

A method and device for calculating ski-jump lengths and the speed of travel of a skier along a ski-jump course comprises a shock sensitive radio transmitter attached to the skier's ski, a stationary radio receiver, a plurality of optical sensors, means for determining a skiers speed and an electronic unit for calculating ski-jump length. Upon impact, a signal transmitted by the radio transmitter is received by the radio receiver together with signals from the optical sensors which detect passage of the skier on the ski-jump course; said signals are then entered into the electronic unit and the means for determining the skier's speed. The electronic unit and the means for calculating the skier's speed respectively calculate the ski jump length and the skier's speed.

9 Claims, 3 Drawing Figures

U.S. Patent
May 9, 1978
4,089,057
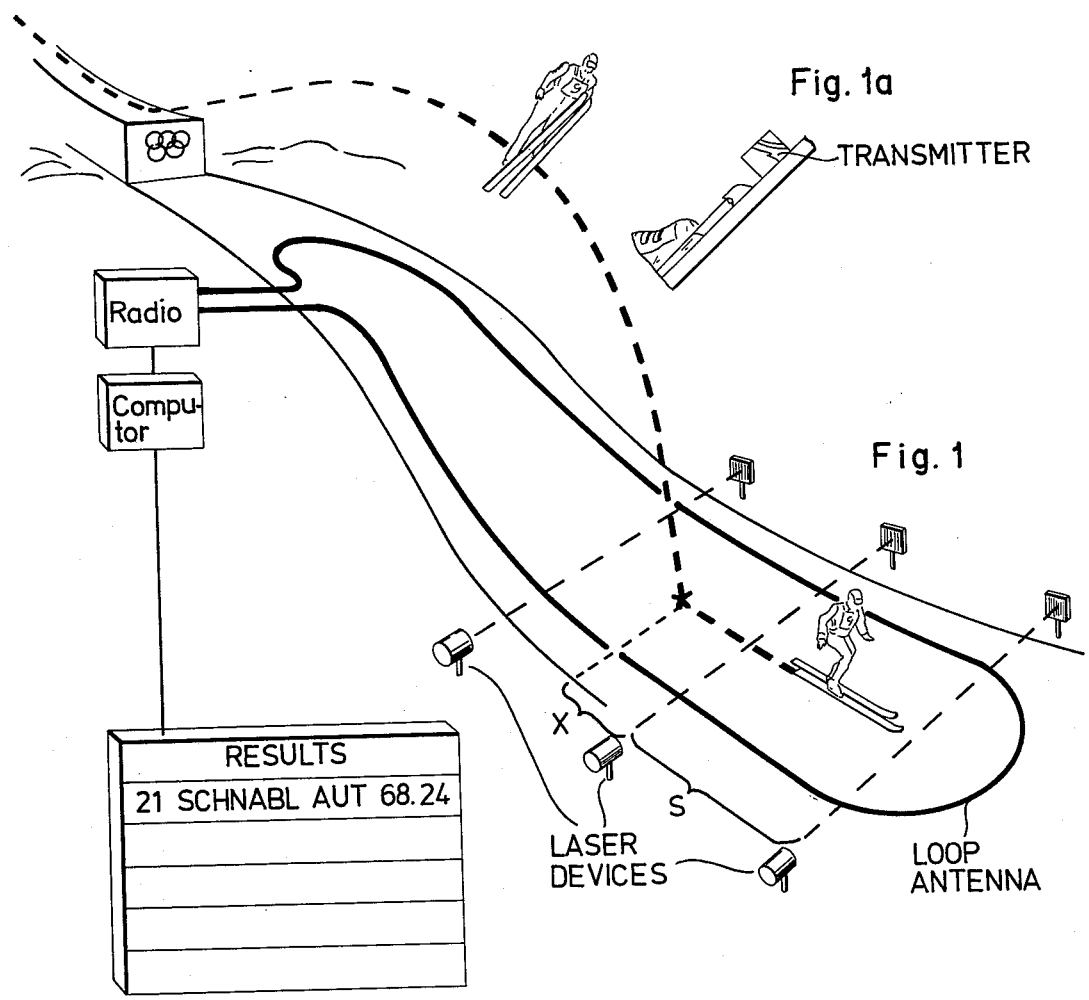
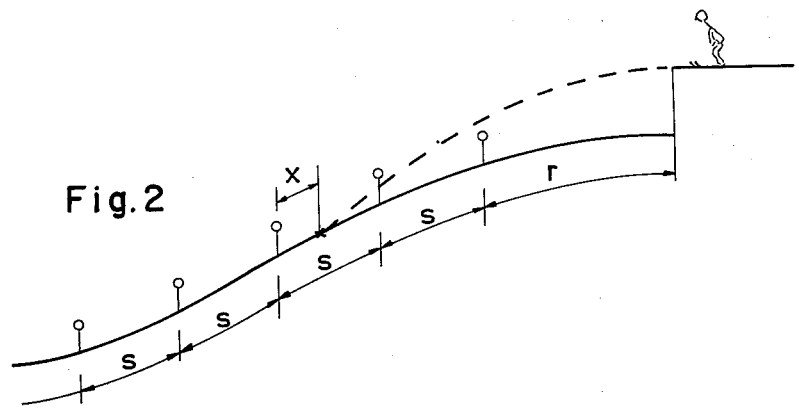

METHOD AND DEVICE FOR MEASURING JUMP-LENGTHS ON A SKI-JUMP

BACKGROUND OF THE INVENTION

This invention relates to a method and a device for objectively measuring jump-lengths on a ski-jump.

In many sporting competitions the results now are measured by means of objective measuring methods. Such methods result in accurate and correct data values so that there is practically no possibility that a competitor will be placed inaccurately due to measuring errors within acceptable statistical margins of error. At slalom racing events, for example, the time of a competitor's speed is measured by one-hundredths of a second. At ski-jumping events, however, it is necessary to determine by manual means the landing point of a skier. In the use of manual measurement methods, measurement errors of several meters are not unusual and, due to the high speed of the ski-jumper at the landing moment (more than 20 m/s), such measurement errors are statistically unavoidable. There is, thus, a need for an objective and correct measuring method at ski-jumping events. Several objective measuring methods have been proposed and tested, but so far none has met the requirements of providing correct measuring values while simultaneously being technically and economically realizable.

SUMMARY OF THE INVENTION

The invention provides a method for objectively measuring jump-lengths of a skier from a ski-jump with high precision. The method is based upon use of shock-sensitive means mounted on the jumper's ski which transmits radio signals to time determination means to start said time determination means at the moment of the skier's landing. Thereafter, the time elapsed from the moment the jumper lands until he crosses and interrupts an optic beam trained across the direction of the jumper's travel is recorded. The said optic beam is located at a known distance along the course of the jumper's travel. This data, together with data acquired from means measuring the jumper's speed at or immediately after the moment of landing, is used for automatic calculation and display of the skier's jump-length.

BRIEF DESCRIPTION OF THE DRAWING

FIG. 1 is a perspective, partially diagrammatic view of a ski-jump course with the device of the invention provided thereon and a skier moving along said course; and FIG. 2 is a side elevational view of the course shown in FIG. 1.

DESCRIPTION OF THE PREFERRED EMBODIMENT

The method is now described in greater detail, with reference to the accompanying drawing. Every jumper is equipped with a small landing transducer package which contains shock-sensitive means and a miniradio transmitter with short range. The package is positioned on the ski just in front of the ski-binding. The package further may include code means which both feeds the transmitter with information on the start number of the skier and delivers a pre-programmed pulse code to "open" a radio receiver, thereby protecting the receiver against interference from foreign transmitters.

The radio receiver is placed stationary and connected to an electronic unit. The antenna of the receiver preferably is a loop antenna laid about the landing area. At the moment of the skier's landing from the jump, the radio transmitter emits a signal to the electronic unit, which signal may consist of either an interruption of an ongoing broadcast during the flight of the ski-jumper, or of the start of a broadcast at the moment of the skier's landing. The first alternative is preferred because an interruption of an ongoing broadcast is considered to be a safer signalling method. If the landing transducer is provided with code means, the information with respect to the start number of the skier then is transmitted to the electronic unit for automatic display while the jumper is in the air.

The time determination means of the electronic unit preferably consists of a pulse generator emitting pulses of a frequency in the range of 1–30 kc/s and a counter with memories. The landing signal emitted by the radio transmitter at the moment of the skier's landing starts the counter, and when the ski-jumper passes a first optic beam, trained across the skier's course of travel, which may for example be a laser beam, the pulse counting is interrupted and the number of pulses is stored in one memory of the counter. In the landing area, a plurality of optical units are placed uniformly and spaced at known distances. Each optical unit includes an optical transmitter and a receiver for a beam trained across and normal to the ski-jumper's jumping direction 10–25 cm above the ground. The receivers may have either wire connections with the electronic unit, or may actuate the same by radio signals and radio receivers. In view of its more dependable operation, wire connection is preferred. The distance between each optical unit ($s$) can be chosen optionally and be adjusted to different types of ski-jumps. When the ski-jumper passes the first optical unit after the landing, the number of pulses ($n_x$) are recorded in the memory of a first counter of the electronic unit, i.e. the number of pulses produced by the pulse generator when the ski-jumper covers the distance ($x$) in the Figures.

For calculating the distance ($x$), the speed at and immediately after the skier's landing must be determined. This can be carried out in different ways. One way is to emit sound-waves from a fixed point at one end of the landing area and to record the Doppler-effect therefore by a receiver on the jumper's ski.

Alternatively, of course, the transmitter can be mounted on the ski. According to an especially advantageous embodiment of the invention, the skier's speed, however, is measured by means which have been described, i.e. the optical units and the counters of the electronic unit.

This special embodiment, which is shown in the drawing, is based on the assumption that the skier's speed can be considered constant from the point of landing to the point where the skier's has passed two subsequent optical units. This assumption has been proved by practical experiments. At the time that the skier's passes the first optical unit, the counter is reset to zero and thereafter records the number of pulses ($n_s$) emitted until the second optical unit is passed at the distance ($s$) from the first unit.

A ski-jumper often lands with one leg ahead of the other. Since the skier's point of landing then is considered to have taken place in the middle between the skier's spread-apart legs, a correction must be made. This can be carried out by a separate counter counting the pulses ($n_k$) produced by the pulse generator from the moment when the skier's front leg breaks the first optical beam after the landing to the moment when the rear leg breaks the same beam. In the memory of the counter a number of pulses are recorded for automatically calculating the correction, which quite simply is $n_k/2$.

When the ski-jumper passes the next optical unit, this unit emits a signal to the electronic unit to stop the first counter. In the first memory of this counter now the number of pulses ($n_x$) is stored, which were produced until the first optical unit was passed, and in a second memory the number of pulses ($n_s$) are stored which were produced between the two optical units having been passed first.

Prior to the start of the ski-jumping, a reference measure ($r$) is fed into the logic of the electronic unit, which measure, for example, may be the distance from the take-off point of the skier to the first optical unit, and a reference measure ($s$), which is the distance between two optical units. The skier's jump-length immediately is calculated in the fixed-programmed logic for data processing and presentation of the electronic unit. The data also may be calculated together with skier's start information, and may be transmitted to an external result panel for display of the data.

The above referred to calculations may be made in the following manner:

$r$ = reference measure for the distance between the skier's take-off and the point at which he passes the first optical unit $n_x$ = number of pulses between the skier's landing and his passage of the forward leg past the first optical unit after the landing $n_k$ = number of pulses between the passage of the skier's forward and rearward leg past the first optical unit $n_s$ = number of pulses between the passage of the skier's between the first two optical units $N$ = figure calculated from the identification code from the optical unit passed first, it being here assumed that the optical units in turn from the distance $r$ render the figures 0, 1, 2 ... etc.

$L$ = jump-length of the skier $s$ = distance between two subsequent optical units $$L = \frac{(n_x + n_k/2)}{n_s} \cdot s + N \cdot s$$

The apparatus for carrying out the method of the invention includes a device for objectively measuring jump-lengths of a skier on a ski-jump. The device includes a landing-transducer package adapted to be mounted on the ski of a ski-jumper. The package has a radio transmitter and shock-sensitive means, which means are intended to start time determination means by emission of a signal from the radio transmitter at the moment of landing of the skier. The device also includes a radio receiver and a plurality of optical units which are mounted at precisely defined spacings within the skier's landing area. Each optical unit includes an optical transmitter for emitting an optical beam which may be located 10–25 cm above the ground and across the path of the skier in the landing area normal to the jumping direction. The optical beams emitted are received by respective optically sensitive transducers. Means are provided for determining the jumper's speed at or immediately after his landing. Also included is an electronic unit having the time determination means for calculating the time between the moment of the skier's landing and a first signal generated from the optical unit which is first passed by the skier when he lands in the landing area and the time between the first signal generated and a second signal generated from the same optical unit. A logic is provided for feed-in of speed data from the speed measuring means, and another logic is provided for the feed-in of reference measures of the ski-jump and distances between the optical units. There also is a code converter for identification codes from each optical unit, and a fixed-programmed logic for data processing and display of said data.

The landing transducer package containing shock-sensitive means, a radio transmitter and, if desired, code means for start information, may be of small size as determined by the size of a battery which must be included in and constitutes the greater part of the package. The shock-sensitive means preferably comprises two permanent magnets, one being fixed and one being spring-suspended. The spring-suspended magnet is locked by a set-screw (for force adjustment) against the terminal point of the fixed magnet. Said spring-suspended magnet, therefore, reacts to forces from only one side, and changes in the magnetic field at very small movements can be used as an accurate indication that the ski-jumper has hit the ground.

Immediately prior to the landing moment, the ski-jumper possibly may "dip" the rear end of the ski with the landing transducer on the ground, creating the risk of a false release of the landing signal. This risk, however, will be small when the aforedescribed shock-sensitive means is used, because the force in this case has a direction other than the direction of the force, by which the spring-suspended magnet is actuated at the landing. For safety reasons, nevertheless the landing transducer may be provided with a protective contact, which renders release impossible as long as the ski is in horizontal or upward inclined position. The protective contact may be a mercury switch.

The optical unit, as shown in the Figures, preferably may consist of a laser, which together with an optical receiver, for example a phototransistor, is positioned on one side of the landing area, and of a vertically positioned reflector means on the other side of the landing area to reflect the laser beam to the receiver. The laser and receiver advantageously are manufactured in one and the same package.

In order to manually test the entire measuring operation prior to a competition, the electronic unit preferably should be equipped with simulator means.

The device of the invention enables very good measuring accuracy is obtained. The electronic unit records an interruption exceeding hundred microseconds as a landing, and the jump-length error referred to the radio-emitted landing signal lies within ± 0.25 mm. When a frequency of about 10 kc/s is chosen for the pulse generator, the pulse counting does not give rise to a jump-length error greater than ± 3 mm. When the skier's speed is measured according to the method based on the assumption that the speed can be regarded being constant between the skier's landing and his movement past the first two optical units passed, the additional increase in error due to a possible acceleration is not greater than that of the total measuring error which lies within ± 5 cm.

What I claim is:

1. A method for measuring the jump-length of a skier who moves on skis along a ski-jump to land along a course at ground level, the skier having shock sensitive radio transmission means mounted to one of his skis, stationery radio receiver means located along the course for receipt of signals from said radio transmission means, said course including at least first and second spaced optical units adapted to emit respective optical beams across said course normal to the direction of travel of the skier along the ground after a jump has been made, each optical unit having a separate identification code, an electronic unit including time determination means, means for measuring the skier's speed of travel along the course, said electronic unit and said means for measuring the skier's speed being interconnected to said optical units and said radio receiver and a display unit connected to said electronic unit, said method comprising the steps of:
  (a) initiating a radio transmission pulse from said shock sensitive transmission means upon impact of the skier's ski on the ground;
  (b) recording the elasped time from the initiation of said radio transmission pulse until interruption by the skier of the beam emitted by said first optical unit,
  (c) calculating the ski-jump length from data including, the number of pulses received from the shock sensitive transmission means after impact of the skier's ski on the ground until the skier interrupts the beam of the first optical unit, the number of pulses received between interruption by the skier of the beam of the first optical unit and interruption of the beam of the second optical unit, the number of pulses between impact of the skier's leg which first touches the ground until interruption of the beam emitted by the first optical unit, the number of pulses between the impact of the skier's leg which next touches the ground until interruption of the beam of the first optical unit, said calculation being made in accordance with the formula $$L = \frac{(n_x + n_k/2)}{n_s} \cdot s + N \cdot s$$

where
  $r$ = reference measure for the distance between the beginning of the ski jump course and the first optical unit,
  $n_x$ = number of pulses between the impact of the first leg of the skier on the ground and interruption of the beam from the first optical unit by that leg,
  $n_k$ = the number of pulses between the landing of the skier's leg which next touches ground and interruption of the beam of the first optical unit by that leg,
  $n_s$ = number of pulses between the interruption of beams of the first and second optical units respectively,
  $N$ = figure calculated from the identification code from the optical unit first passed,
  $L$ = jump length of skier,
  $s$ = distance between two subsequent optical units;
  (d) displaying the ski jump length on a display unit.

2. A method for determining the speed of the ski-jumper as claimed in claim 1 further including the steps of:
  (a) setting the time determination means to zero prior to the skier's commencing the ski-jump;
  (b) starting the time determination means after the skier interrupts the beam of the first optical unit after impact;
  (c) measuring the elpased time of the skier between the interruption of the beam of the first optical unit and interruption of the beam of the second optical unit;
  (d) determining the speed of the skier from data thus obtained by means for determining the speed of the ski-jumper.

3. A method as claimed in claim 2 for correcting the jump length where the skier lands with legs spread apart comprising the steps of:
  (a) recording the time difference between the interruption by the skier's forward leg across the beam emitted by the first optical unit as determined from impact until the interruption of that beam by passage of the skier's rearward leg;
  (b) correcting the jump length previously determined using the time difference between the interruption of the beam of the first optical unit by the skier's forward and rearward legs.

4. A device for measuring jump lengths on a ski-jump where a skier wearing skis jumps from a first elevation to a second elevation at ground including:
  (a) landing transducer means attached to a skier's ski including a radio transmitter and shock sensitive means for activating said transmitter upon impact;
  (b) a stationary radio receiver tuned to said transmitter;
  (c) at least a first and a second optical unit mounted a pre-determined distance apart along the second elevation of the ski-jump course, each said optical unit comprising an optical transmitter at ground emitting an optical beam across the ski-jump course and an optical transducer so mounted as to receive said optical beam;
  (d) means for determining the ski-jumper's speed immediately after landing, said means being interconnected to said radio receiver and said optical units;
  (e) an electronic unit coupled to the radio receiver, the optical units and the means for determining the ski-jumper's speed, said electronic unit including time determination means for calculating the time difference between the moment of first landing of the skier and interruption by the skier of the beam emitted by the first optical unit, and for determining the time difference between a first and second signal from the same optical unit, said electronic unit being interconnected to and receiving data from said means for determining the skiers speed said optical units and said radio receiver, said electronic unit also containing fixed logic means for calculating the ski-jump length from the data entered into the electronic unit from said optical units, said radio receiver and said means for determining the ski-jumper's speed.

5. A device as recited in claim 4 wherein said means for determining the ski-jumper's speed include time determination means attached to said optical units, said time determination means adapted to calculate the time difference between interruption by the skier of the beams of said first and second optical unit.

6. A device as recited in claim 5 wherein said time determination means further include:
  (a) a pulse generator with a frequency range of between 1–30 kcls;

(b) a first counter adapted to count the number of pulses from said pulse generator between impact of skier on the ground and a signal from the first optical unit after the skier has interrupted the beam from said optical unit;
(c) a second counter adapted to count the number of pulses from said pulse generator between signals from said first and second optical unit when the skier has interrupted the beam of said first and second unit respectively;
(d) data processing means having pre-programmed reference distances for calculating the ski-jump length using only pre-programmed reference distances and the ratio between the number of counted pulses, said data processing means being connected to and receiving data from said pulse generator and said first and second counters.

7. A device as recited in claim 4 wherein said optical unit comprises a laser and a phototransistor to be positioned on one side of the landing path and reflector means to be positioned vertically on the other side of the landing path.

8. A device as recited in claim 4 wherein said shock sensitive means for activating said transmitter includes:
(a) a fixed permanent magnet;
(b) a spring suspended permanent magnet locked by a set screw against the terminal point of said fixed magnet so as to react only on force from one side.

9. A device as recited in claim 4 wherein said landing transducer means includes a code part for feeding the radio receiver with a pre-programmed pulse code which renders information on the start number for presentation while the ski-jumper is in the air as well as protecting the receiver from interference from foreign transmitters such that the receiver is only opened by the pre-programmed pulse code.

* * * * *